United States Patent [19]
Chen et al.

[11] Patent Number: 5,422,963
[45] Date of Patent: Jun. 6, 1995

[54] BLOCK TRANSFORM CODER FOR ARBITRARILY SHAPED IMAGE SEGMENTS

[75] Inventors: Homer H. Chen; Mehmet R. Civanlar; Barin G. Haskell, all of Monmouth County, N.J.

[73] Assignee: AT&T Corp., Murray Hill, N.J.

[21] Appl. No.: 138,295

[22] Filed: Oct. 15, 1993

[51] Int. Cl.⁶ ............................................. G06K 9/00
[52] U.S. Cl. .................................. 382/232; 348/395; 348/420; 358/433
[58] Field of Search ...................... 382/56, 21, 41, 48; 358/433; 348/395, 420, 416

[56] References Cited

U.S. PATENT DOCUMENTS 5,295,201  3/1994  Yokohama ........................... 382/48

OTHER PUBLICATIONS

A. N. Netravali and B. G. Haskell. *Digital Pictures, Representation and Compression.* Plenum Press, 1988.

M. Gilge, T. Engelhardt, and R. Mehlan. Coding of Arbitrarily Shaped Image Segments Based On A Generally Orthogonal Transform. *Signal Processing: Image Communication*, vol. 1:153–180, 1989.

A. Kaup and T. Aach. A New Approach Towards Description of Arbitrarily Shaped Image Segments. In *IEEE* Workshop on Intelligent Signal Processing and Communication Systems, pp. 543–554, Mar. 1992.

S. Chang and D. G. Messerschmitt. Transform Coding of Arbitrarily-Shaped Image Segments. In *Proceedings of ACM Multimedia*, Aug. 1993.

P. L. Combettes. The Foundation of Set Theoretic Estimation. Proceedings of the IEEE, vol. 81 (No. 2): 182–208, Feb. 1993.

Jae S. Lim. *Two Dimensional Signal and Image Processing.* Prentice Hall, 1990.

ISO/IEC JTC1/SC29/WG11 MPEG 92/699, "Project Description for Very-Low Bitrate A/V Coding," Nov. 5, 1992.

"The Foundation of Set Theoretic Estimation", *Proceedings of the IEEE*, vol. 81, No. 2 (Feb., 1993).

*Primary Examiner*—Leo H. Boudreau

[57] ABSTRACT

A Transform Coder Unit (TCU) to transform an arbitrarily shaped image into optimal transform coefficients (OTC) for data transmission. The TCU comprises a forward transform which transforms the image to transform coefficients, and a TCS generator which generates a transform coefficient set (TCS) from the transform coefficients. The TCU also contains an inverse transform which transforms the TCS to a computed region block having computed pel values. Finally, the TCU comprises a replacer which replaces those computed pel values corresponding to the interior pel set with the original pel values to form a modified computed region block which is re-iterated until optimal transform coefficients are determined. The present invention is also directed at a process for determining optimal transform coefficients using the aforementioned device.

20 Claims, 2 Drawing Sheets

BLOCK TRANSFORM CODER FOR ARBITRARILY SHAPED IMAGE SEGMENTS

BACKGROUND OF THE INVENTION

1. Field of the Invention

The present invention relates generally to a method and device to code images for data transmission, and more specifically to a method and device to determine the optimal transform coefficients for an irregular shaped image for low bit-rate transmission using standard transforms.

2. Information Disclosure Statement

Although current video coding standards may operate at very low bitrates, the trade-off between temporal and spatial resolution results in visually annoying motion or spatial artifacts. Therefore, the International Organization for Standardization is considering developing a new standard for very low bitrate A/V coding. ISO/IEC JTC1/SC29/WG11 MPEG 92/699, "Project Description for Very-Low Bitrate A/V Coding" (Nov. 5, 1992). This document reviews the state of the art and proposes a direction for future research.

In typical image coding systems, the image to be coded is usually processed using N×N blocks of picture elements (pels) regardless of the image content. This approach, however, may lead to visible distortions known as blocking and mosquito effects, particularly at low bit-rates. To avoid these visual artifacts, region-based image representation partitions the image into regions of similar motion or texture, yielding image segments of arbitrary shape instead of fixed (rectangular) blocks. Such image representation offers several advantages over the conventional block-based representation such as adaptation to local image characteristics. Consequently, region-based image representation has received considerable attention in MPEG4 video coding standard work for very low bitrate coding.

A fundamental issue in region-based image compression is the coding of arbitrarily shaped image segments. An arbitrarily shaped image segment $f(x,y)$ can be approximated by a set of basis functions optimized for the shape of the image segment to be coded:

$$f(x,y) = \sum_i \alpha_i \phi_i(x,y) \qquad (1)$$

where $x,y \in S$, $S$ is the region occupied by the image segment, $f(x,y)$ is the approximation of the image segment, and $\phi_i$'s are the basis functions. However, such shape-adapted transform techniques require a large amount of memory for storing the set of basis functions. As a result, these techniques are only suitable for small regions. Furthermore, for each new segment a new set of basis functions has to be computed. Thus, extensive computation is involved. Since no fast algorithms exist, these techniques are not attractive for practical use.

Another popular approach is to use one of the most popular image compression techniques, transform coding. In transform coding, an image is transformed from the image intensity domain to a new domain prior to coding and transmission. The new domain is selected so that the energy of the image becomes concentrated to a small region in the new domain. Among the various transforms, the discrete cosine transform (DCT) is the most widely used transform. It has become the industry standard because it provides a good approximation of the optimal Karhunen-Loeve transform (KLT) for a certain class of images, and can be computed by means of fast algorithms.

With block transform coding, the image segment can be approximated by a set of two-dimensional basis functions defined on a rectangular block "B" which circumscribes the image:

$$f(x,y) = \sum_i \beta_i \psi_i(x,y) \qquad (2)$$

where $x,y \in S$, and $\psi_i$'s are the basis functions defined on the full block B. The best approximation $f(x,y)$ of an image segment can be found by minimizing the squared error between the image segment and the approximation, i.e., $$\text{error} = \Sigma(f(x,y) - f(x,y))^2 \qquad (3)$$

This is equivalent to solving the Gaussian normal equations. Note that the summation is taken over the region defined by the image segment; pels outside the region are discarded. Since the number of pels of the image segment is usually less than the number of basis functions, the problem is undetermined, and several solutions are possible. To arrive at a single solution, the problem can be solved by successive approximation. This involves starting with a small subset of basis functions and exhaustively searching for the best solution. Although successive progression will yield a solution, the computational cost is high. Furthermore, like the shape-adapted techniques, no fast algorithms are available to make real-time implementation possible.

A more efficient approach is to perform the transform on the entire block, $$f(x,y) = \sum_i \gamma_i \psi_i(x,y) \qquad (4)$$

where $x,y \in B$, and B is the area of the block. The transform can be performed in real-time by special purpose chips designed for block transforms. However, this technique requires that the pels outside the image segment be initialized before the transform occurs. The outside pels can be chosen such that the sum of squared errors over the image segment expresses by Equation (3) is minimized. This approach enables the transform spectrum to be optimized by choosing appropriate pel values outside the image segment. To this end, zeroing the outside pels would be an easy way to initialize them. This approach, however, introduces discontinuities at the boundary of the image segment, yielding high frequency components that degrade the coding performance. To alleviate the problem, the image segments can be extrapolated outside the boundary by mirroring or pel repetition such that a smoother transformation can be obtained. This ad hoc approach though, fails to provide consistent, satisfactory results. Consequently, a more promising method is needed. The present invention fulfills this need.

The present invention utilizes the theory of successive projection onto convex sets (POCS). In Patrick L. Combettes, "The Foundation of Set Theoretic Estimation," *Proceedings of the IEEE*, Vol. 81, No. 2 (Feb. 1993), this theory is described in a theoretical sense. The present invention applies this theory in a practical sense to image coding.

SUMMARY OF THE INVENTION

The present invention is directed at a method and a device for determining the optimal transform coefficients for an arbitrarily shaped image for data transmission. The invention uses block transforms with frequency domain region-zeroing and space domain region-enforcing operations for effectively coding arbitrarily shaped image segments. The block transform is computed over a rectangular block which circumscribes the arbitrary shape. To find the best values for a group of selected transform coefficients, the invention uses an iterative technique based on the theory of successive projection onto convex sets (POCS). A key feature of the technique is that it works with existing block transform coding hardware (such as DCT chips) and software. Therefore, it can be implemented using existing codec component at an insignificant cost.

DETAILED DESCRIPTION OF THE PRESENT INVENTION

The present invention relates to an iterative technique to determine optimal transform coefficient values for the coding of arbitrarily shaped images. The convergence of the iteration to the optimal solution is guaranteed by the theory of successive projection onto convex sets (POCS). The technique can be described within the POCS context by using two sets of images.

The first set is defined based on a basic premise of transform coding—the energy compaction property of transform coefficients. This property provides that a large amount of energy is concentrated in a small fraction of the transform coefficients, and only these coefficients need to be kept for coding the image. The set of images which can be represented using a selected group of transform coefficients constitute the first set and will be referred to as the transform coefficients set (TCS). This set is convex for all linear and some non-linear transformations. The projection of an arbitrarily shaped image block onto this set can be determined by computing the block transform and selecting and retaining high energy coefficients. The remaining, non-selected coefficients are zeroed (region-zeroing in the frequency domain).

The second set is derived form the fact that the values of the pels outside of the arbitrary shaped region are irrelevant to coding. Thus, the second set becomes the set of images whose pel values within the arbitrarily shaped region are specified by the image to be coded. This set is referred to as the region of support set (RSS). This set is convex. The projection of an arbitrarily shaped region onto this set can be obtained by replacing those pel values corresponding to the image's interior pels with the original pel values (region-enforcing in the space domain). This theory provides the basis for the present invention.

Figure 1:
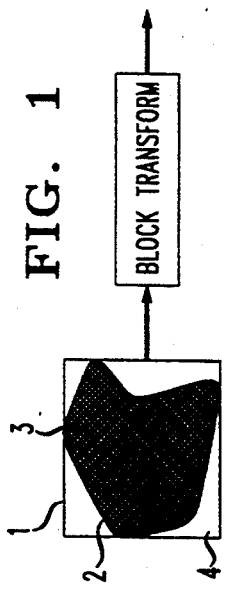
FIG. 1 depicts an arbitrary shape and the circumscribed rectangular region.

The present invention basically comprises two parts. FIG. 1 depicts the first part which involves generating and preparing the data to be coded. In this step, a rectangular region block is circumscribed around an arbitrarily shaped image 2. This defines an original internal pel set 3 which lies within arbitrarily shaped image 2 and within region block 1, and an original external pel set 4 which lies outside arbitrarily shaped image 2 and within region block 1.

To initialize the pel values of external pel set 4, an extrapolator 5 extrapolates the pel values of internal pel set 3. Examples of extrapolation methods include mirroring or pel repetition of the segments of internal pel set 3. Once external pel set 4 is initialized, the image data can be manipulated in the second part.

Figure 2:
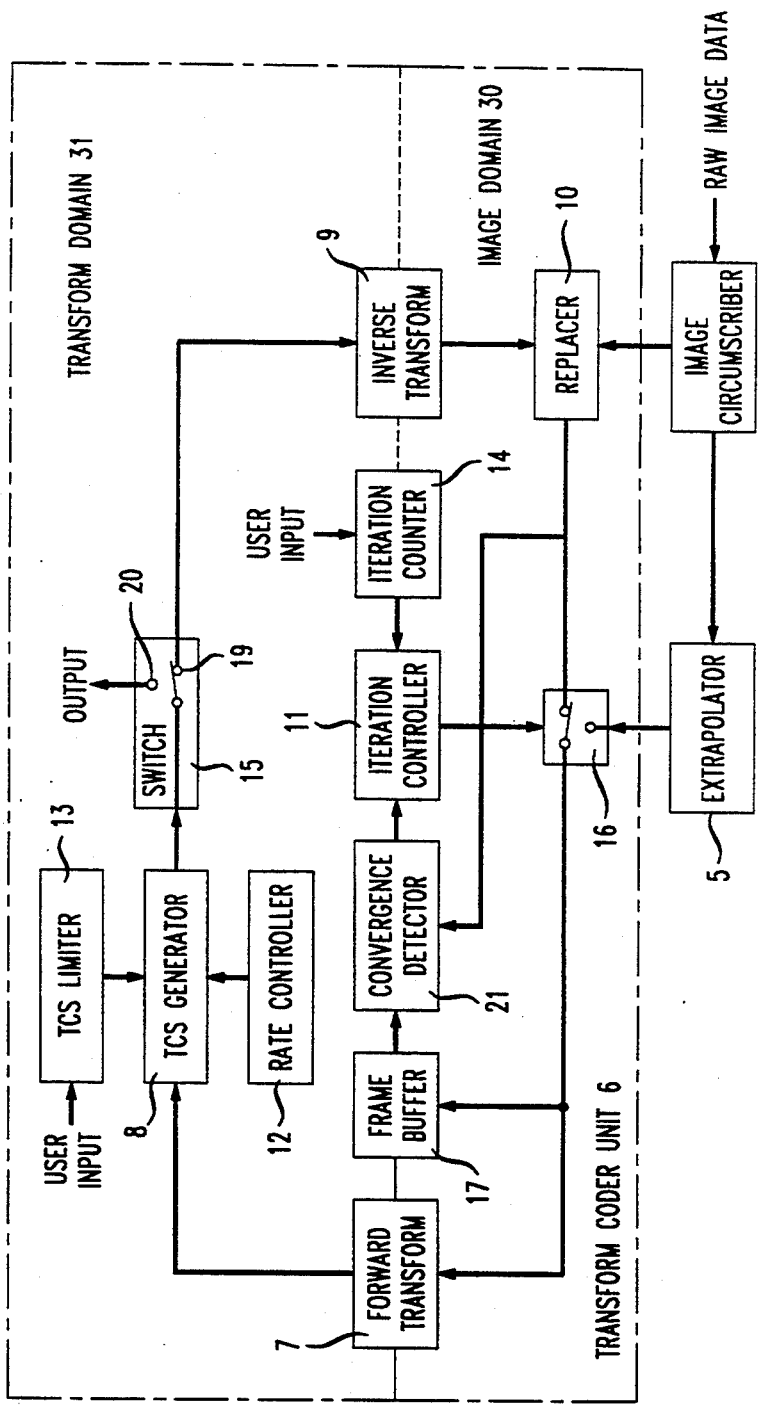
FIG. 2 shows a preferred embodiment of the TCU which detects convergence in the image domain.

The second part involves a transform coder unit (TCU) 6 performing a POCS iteration loop on the image data. TCU 6 is shown in FIG. 2. TCU 6 comprises a forward transform 7, which operates at real-time and transforms the image from the image domain 30 to the transform domain 31.

Next, a TCS generator 8 generates a transform coefficient set (TCS) from the transform coefficients. This can be accomplished in a couple of ways. First, TCS generator 8 may contain a quantizer which generates the TCS by quantizing the transform coefficients. There is no convergence guarantee, however, under this alternative. A more preferred embodiment utilizes the energy compaction property of transform coefficients. This property holds that a large amount of energy is concentrated in a small fraction of the transform coefficients. Therefore, TCS generator 8 need only select and retain these coefficients for coding the image. The remaining transform coefficients can be zeroed.

If the energy compaction property is used to generate the TCS, then the number of coefficients to retain should be established. This may accomplished-via a rate controller 12. Rate controller 12 can establish the threshold energy level at which to retain coefficients based on the size of the arbitrarily shaped image, and the bit budget of the encoder which will eventually code the transform coefficients. Alternatively, the number of transform coefficients to retain can be established independently via a TCS limiter 13 at the beginning of each iteration. A combination of both these mechanisms could be used as well.

TCS generator 8 outputs the TCS from the TCU if the TCS represents the optimal transform coefficients (OTC). Otherwise, TCS generator 8 sends the TCS to an inverse transform 9. Inverse transform 9 converts the TCS from transform domain 31 to image domain 30, thereby producing a computed regional block having computed pel values.

A replacer 10 replaces those computed pel values corresponding with internal pel set 3 with the original pel values, thereby forming a modified computed regional block (MCRB). The MCRB is then re-iterated through a re-iterative forward transform. In the preferred embodiment of FIGS. 2 and 3, the re-iterative forward transform and forward transform 7 are the same. Thus, the same TCU will re-iterate the MCRB.

Figure 4:
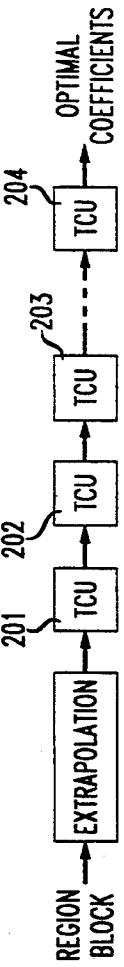
FIG. 4 shows another preferred embodiment of the present invention wherein a multiplicity of TCU are connected in series.

The re-iterative forward transform and forward transform 7, however, can be different. For example, FIG. 4 shows a successive connection of TCUs 201–204. In this configuration, the re-iterative forward transform of TCU 201 is the forward transform of succeeding TCU 202. Thus, the modified computed region block is re-iterated through different TCUs. The number of TCUs in series determines the number of iterations performed.

Figure 3:
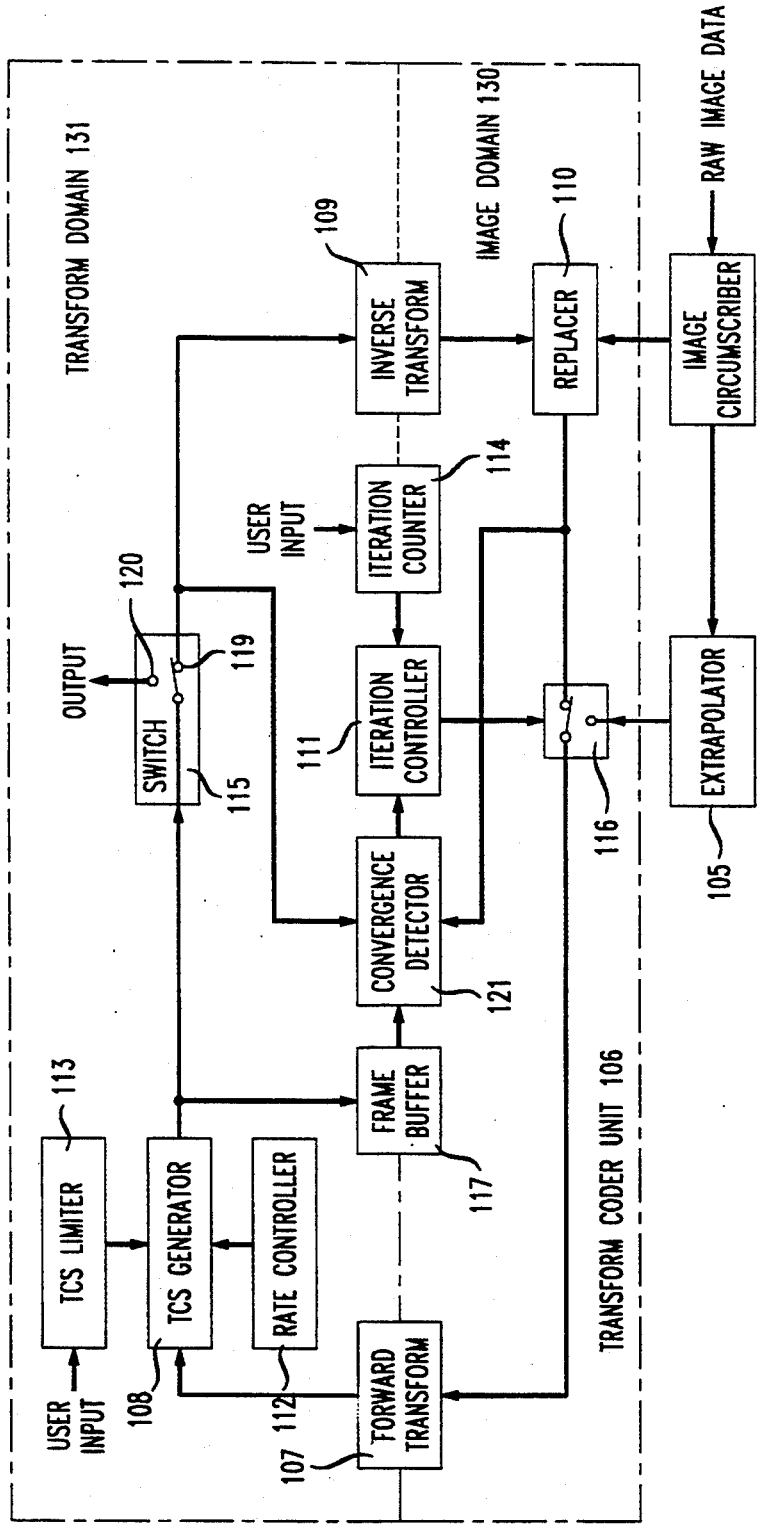
FIG. 3 shows another preferred embodiment of the TCU which detects convergence in the transform domain.

Although the number of iterations depends upon the number of successive TCUs in the embodiment of FIG. 4, the number of iterations is variable in the embodiments of FIGS. 2 and 3. Consequently, an iteration controller 11 is employed in both embodiments. Referring only to FIG. 2, iteration controller 11 controls switch 15 which has a first position 19 and a second position 20. First position 19 directs the TCS from TCS generator 8 to inverse transform 9 when the TCS does not represent the OTC. Second position 20 directs the TCS from TCS generator 8 to a quantizer when the TCS represents the OTC.

Iteration controller 11 may control the switching of switch. 15 through a couple of mechanisms. As FIG. 2 shows, an iteration counter 14 can be used to count the number of iterations. When a pre-determined number is reached, iteration counter 14 will signal iteration controller 11 which will move switch 15 from first position 19 to second position 20.

FIG. 2 depicts another method of controlling switch 15 by monitoring image domain 30 of the TCU. Here, a convergence detector 21, and a frame buffer 17 are employed. Frame buffer 17 stores the pel values of the previous iteration. Convergence detector 21 switches switch 15 from first position 19 to second position 20 when the mean squared difference between the computed pel values stored in frame buffer 17 and those of the current iteration reaches a pre-determined level.

FIG. 3 depicts a device which also controls switch 115, but does so by monitoring transform domain 131 of TCU 106 using a convergence detector 121, and a frame buffer 117. Frame buffer 117 stores the TCS of the previous iteration. Convergence detector 121 switches switch 115 from first position 119 to second position 120 when the mean squared difference between the TCS stored in frame buffer 117 and that of the current iteration reaches a predetermined level.

Obviously, numerous modifications and variations of the present invention are possible in light of the above teachings. It is therefore understood that within the scope of the appended claims, the invention may be practiced otherwise than as specifically described herein.

What is claimed is:

1. An apparatus for selecting image data representing an arbitrarily shaped image for optimizing transmission of said image data said apparatus comprising:
   a. first means for transforming said arbitrarily shaped image to transform coefficients;
   b. second means coupled to said first means for generating a transform coefficient set (TCS) from said transform coefficients, said TCS generator being configured to output said TCS when said TCS represents said selected image data, and to send said TCS to an inverse transform when said TCS does not represent said selected image data;
   c. third means coupled to said second means for transforming said TCS to a computed region block having computed pel values; and
   d. fourth means coupled to said third means for replacing computed pel values corresponding to art interior pel set of said arbitrarily shaped image with original pel values of said arbitrarily shaped image so as to form a modified computed region block (MCRB), said fourth means being configured to send a modified computed region block to a reiterative forward transform for re-iteration.

2. The apparatus of claim 1, wherein said second means includes a quantizer which generates said TCS by quantizing said transform coefficients.

3. The apparatus of claim 1, wherein said second means generates said TCS by selecting and retaining those transform coefficients which have high energy according to the energy compaction property of transform coefficients, and by zeroing all the non-selected transform coefficients.

4. The apparatus of claim 3 wherein said second means comprises a rate controller to establish a threshold energy level at which said TCS selector retains transform coefficients, said rate controller establishes said level based on the bit budget of an encoder and the size of said arbitrarily shaped image.

5. The apparatus of claim 3 wherein said second means comprises a TCS limiter to independently establish the number of transform coefficients to retain.

6. The apparatus of claim 1, wherein said re-iterative forward transform and said forward transform are one in the same, and further comprising:
   e. an iteration controller which controls an iteration switch having a first position and a second position, said first position directs TCS from said TCS generator to said inverse transform when said TCS does not represent said selected image data, said second position directs said TCS from said TCS generator to output of said TCU.

7. The apparatus of claim 6, wherein said iteration controller comprises an iteration counter to independently establish the number of iterations to perform, after said apparatus performs the established number of iterations, said switch switches to said second position.

8. The apparatus of claim 6, wherein said iteration controller contains a convergence detector, and a frame buffer, said frame buffer stores the pel values of a previous iteration, said convergence detector switches said switch from said first position to said second position when the mean squared difference between said MCRB stored in said frame buffer and that of the current iteration reaches a pre-determined level.

9. The apparatus of claim 6, wherein said iteration controller contains a convergence detector, and a frame buffer, said frame buffer stores the TCS of a previous iteration, said convergence detector switches said switch from said first position to said second position when the mean squared difference between the TCS stored in said frame buffer and that of the current iteration reaches a pre-determined level.

10. The apparatus of claim 1 wherein said re-iterative forward transform comprises a forward transform of a succeeding apparatus, said succeeding apparatus connected in series with said apparatus.

11. The apparatus of claim 1 wherein said forward transform is a discrete cosine transform (DCT) chip.

12. An apparatus for selecting image data representing an arbitrarily shaped image for optimizing low-date rate transmission of said image data, said apparatus comprising:
   (a) generating means for generating original pel values, said generating means including;
      (i) circumscribing means for circumscribing said arbitrarily shaped image with a rectangular region block, thereby creating an internal pel set which lies within said arbitrarily shaped image and within said region block, and an external pel set which lies outside said arbitrarily shaped image within said region block; and (ii) initializing means for initializing pel values of said external pel set by extrapolating the pel values of said internal pel set;

(b) operating means for operating a transform coder unit (TCU) which calculates optimal transform coefficients, said operating means including;

(i) means for performing a forward transform on said region block to generate transform coefficient;

(ii) means for generating a transform coefficient set (TCS) from transform coefficients;

(iii) means for performing an inverse transform on said TCS thereby generating a computed region block having computed pel values;

(iv) means for replacing those computed pel values corresponding to said internal pel set with original pel values to form a modified computer region block (MCRB);

(v) means for determining whether said TCS represents said OTC;

(vi) means for reiterating steps (i) and (ii) on said modified computed region block and outputting said TCS when said TCS represents OTC; and (vii) reiterating steps (i) through (vii) on said modified computed region block when said TCS values do not represent said OTC.

13. The apparatus as recited in claim 12, wherein said means for performing a forward transform includes a discrete consine transform (DCT) chip.

14. The apparatus as recited in claim 12, wherein said means for generating said TCS is configured to quantize said transform coefficients.

15. The apparatus as recited in claim 14, wherein said means for generating said TCS is further configured to select and retain those transform coefficients which have high energy according to the energy compaction property of transform coefficients, and zeroing the non-selected transform coefficients.

16. The apparatus as recited in claim 15, wherein said TCS includes a rate controller to establish a threshold energy level at which transform coefficients are retained, said rate controller being configured to establish said level based upon the bit budget of an encoder and the size of said arbitrarily shaped image.

17. The apparatus as recited in claim 15, wherein said means for generating said TCS is further configured to independent establish a number of transform coefficients to retain.

18. The apparatus as recited in claim 12, wherein said means for determining whether said TCS represents said OTC is configured to independently establish the number of iterations to perform.

19. The apparatus as recited in claim 18, wherein said means for determining whether said TCS represents said OTC is further configured to determine when the means squared difference between said MCRB of one iteration and that of a subsequent iteration reaches a predetermined threshold.

20. An apparatus for selecting image data representing an arbitrarily shaped image for optimizing transmission of said image data, said apparatus comprising:

(a) means for generating original pel values, said means including:

(i) means for circumscribing said arbitrarily shaped image with a rectangular region block, thereby creating an internal pel set which lies within said arbitrarily shaped image and within said region block, and an external pel set which lies outside said arbitrarily shaped image and within said region block; and (ii) means for initializing pel values of said external pel set by extrapolating the pel values of said internal pel set;

(b) means for operating a transform coder unit (TCU) for calculating optimal transform coefficients, said means for operating a TCU including:

(i) means for performing a forward transform on said region block to generate transform coefficients;

(ii) means for generating a transform coefficient set (TCS) from said transform coefficients;

(iii) means for determining whether said TCS represents optimal transform coefficients (OTC);

(iv) means for outputting said TCS when said TCS represents said OTC;

(v) means for performing an inverse transform on said set TCS when said TCS does not represent said OTC, said inverse transform generates a computed region block having computed pel values;

(vi) means for replacing those computed pel values corresponding to said internal pel set with original pel values so as to form a modified computed region block; and (vii) means for reiterating steps (i) through (vii) on said modified computed region block.

* * * * *